Patented Mar. 15, 1932

1,849,053

UNITED STATES PATENT OFFICE

KONRAD BERNHAUER AND LEO SCHULHOF, OF PRAGUE, CZECHOSLOVAKIA, ASSIGNORS TO CHARLES PFIZER & COMPANY, OF NEW YORK, N. Y., A CORPORATION OF NEW JERSEY

PRODUCTION OF GLUCONIC ACID

No Drawing.  Application filed November 26, 1927. Serial No. 236,003.

This invention relates to production of gluconic acid by fermentation and has for its object to provide an improved and more practical method than has heretofore been known, whereby a greater yield will be obtained in a shorter time.

According to this invention, a two-stage process is provided, wherein the first stage employs a culture medium especially selected to promote the growth of the fungus, which is thereupon brought into contact with a second culture medium and especially adapted for the rapid and efficient production of the desired gluconic acid. This process is based upon the discovery that the growth of a fungus suitable for acid production requires conditions which are more or less unsuitable for production of the acid from the fungus, so that the single stage process wherein both the growth and the production of acid are to be in one culture medium has the disadvantage of being a compromise between more or less opposing extremes.

A principle of this invention is characterized by the use of developed mycelia on fresh culture solution, or what may be called a method of previously developed mycelia, and thereupon bringing such mycelia developed under most favorable conditions into contact with the carbohydrate solution best adapted for production of the acid from the culture.

For the ferment a culture of *Aspergillus niger*, or *Sterigmatocystis nigra* is selected which has been tested and proved to be a good gluconic acid generator.

The fungi are developed in a definite nutrient solution prepared solely for this purpose and grown until a uniform mycelium has formed; then the partly changed solution or first culture liquor is poured off the mycelium, the latter rinsed with sterile water and a new sterile solution of a definite composition suitable for the formation of gluconic acid is added, this latter solution being the second culture liquor.

The first culture liquor is such as to form a well developed, fully closed mycelium in three to four days. A composition suitable for this is as follows:

| | Per cent |
|---|---|
| Cane sugar | 10 |
| Peptone | .15 |
| Potas. biphosphate | 0.1 |
| Magnesium sulphate | 0.05 |
| Calcium chloride | 0.01 |

A suitable temperature is 30° C. and the desired growth obtained in from 4 to 5 days.

The second culture liquor is such as to allow little or no growth, has a slightly alkaline condition, but at the same time not interfering with the oxidative processes of the fungus for acid production. Cane sugar or glucose solutions are used from a concentration of 10–40%, preferably about 20%, with the addition of calcium oxide or other suitable neutralizing substances such as calcium carbonate or sodium carbonate to neutralize the acid as formed. A slight excess of neutralizing substance is not objectionable. A suitable temperature is 25°–30° C., and a yield of 70–80% of calcium gluconate, based on sugar consumed, is obtained in 4–5 days. The amount of neutralizing agent can be calculated from the maximum amount of carbohydrate intended to be converted.

The solution is drained off with any excess of calcium carbonate or oxide which may remain, heated to boiling and filtered. Part of the calcium gluconate will crystallize out when the solution is cooled, and a further fraction can be obtained by addition of alcohol. Gluconic acid can be prepared from the calcium gluconate by the usual method of decomposition with sulphuric acid, removal of calcium sulphate by filtration, and evaporation of the filtrate. It is of course obvious that the fermentation may be effected without the addition of neutralizing substances, and the gluconic acid formed may be recovered as such in the well known manner.

What is claimed is:

1. Process of preparing gluconic acid by fermentation, comprising effecting growth of a gluconic acid generating mycelium in a nutrient culture medium, removing the medium, and contacting the developed mycelium with an alkaline, acid-forming culture medium in the absence of nutrient salts, and recovering a gluconic acid salt therefrom.

2. Process of preparing gluconic acid by fermentation with *Aspergillus niger* comprising growing a mycelium thereof in a culture medium containing sugar and nutrient salts at a temperature of about 30° C., removing said medium, washing the mycelium, causing such mycelium to produce gluconic acid in an alkaline solution containing sugar and acid neutralizing material at a lower temperature, and recovering the gluconic acid salt formed.

3. Process of preparing gluconic acid by fermentation, comprising effecting growth of a gluconic acid generating mycelium in a nutrient culture medium, removing the medium, and contacting the developed mycelium with a carbohydrate solution containing an alkaline substance of the group consisting of calcium hydrate, calcium carbonate and sodium carbonate, in the absence of nutrient salts and recovering a gluconic acid salt therefrom.

4. Process of preparing gluconic acid by fermentation, comprising effecting growth of a gluconic acid generating mycelium in a nutrient culture medium, separating the medium and the mycelium, and contacting the developed mycelium with an acid forming culture medium of such alkalinity as to retard growth of the mycelium and in the absence of nutrient salts, and recovering gluconic acid therefrom.

Signed at Prague, Czechoslovakia, this 9th day of November A. D. 1927.

KONRAD BERNHAUER.
LEO SCHULHOF.